United States Patent [19]

Davenport et al.

[11] 4,450,938

[45] May 29, 1984

[54] AIR LINE LUBRICATOR

[75] Inventors: Henry A. Davenport, Roanoke; Robert E. Barrows, Fincastle, both of Va.

[73] Assignee: Ingersoll-Rand Company, Woodcliff Lake, N.J.

[21] Appl. No.: 451,027

[22] Filed: Dec. 20, 1982

[51] Int. Cl.³ .................. F16N 11/10; F16N 13/16
[52] U.S. Cl. ................... 184/42; 184/55 A; 184/56 R
[58] Field of Search ............ 184/56 A, 56, 55 A, 184/55, 6.26, 42

[56] References Cited

U.S. PATENT DOCUMENTS

| 458,450 | 8/1891 | Fitzgerald | 184/42 |
|---|---|---|---|
| 1,548,869 | 8/1925 | Clore | 184/42 X |
| 1,606,758 | 11/1926 | Greene | 184/56 R X |
| 3,209,956 | 10/1965 | McKenzie | 184/42 X |
| 3,693,757 | 9/1972 | Callahan et al. | 184/56 A X |
| 3,837,431 | 9/1974 | Freize et al. | 184/55 A X |
| 4,105,095 | 8/1978 | Thrasher | 184/55 A |
| 4,125,176 | 11/1978 | Thrasher | 184/56 A |
| 4,332,309 | 6/1982 | Bereit | 184/55 A X |

Primary Examiner—David H. Brown
Attorney, Agent, or Firm—Walter C. Vliet

[57] ABSTRACT

An air line lubricator for air motors and the like which is self priming and provides a controlled, continuous supply of oil for a limited duration once the air line is pressurized. The lubricator utilizes a unique check seal in combination with a bevelled and stepped piston. The construction further allows the use of a single ball check and deposits the lubricating oil directly into the air stream apart from the air line surface.

9 Claims, 1 Drawing Figure

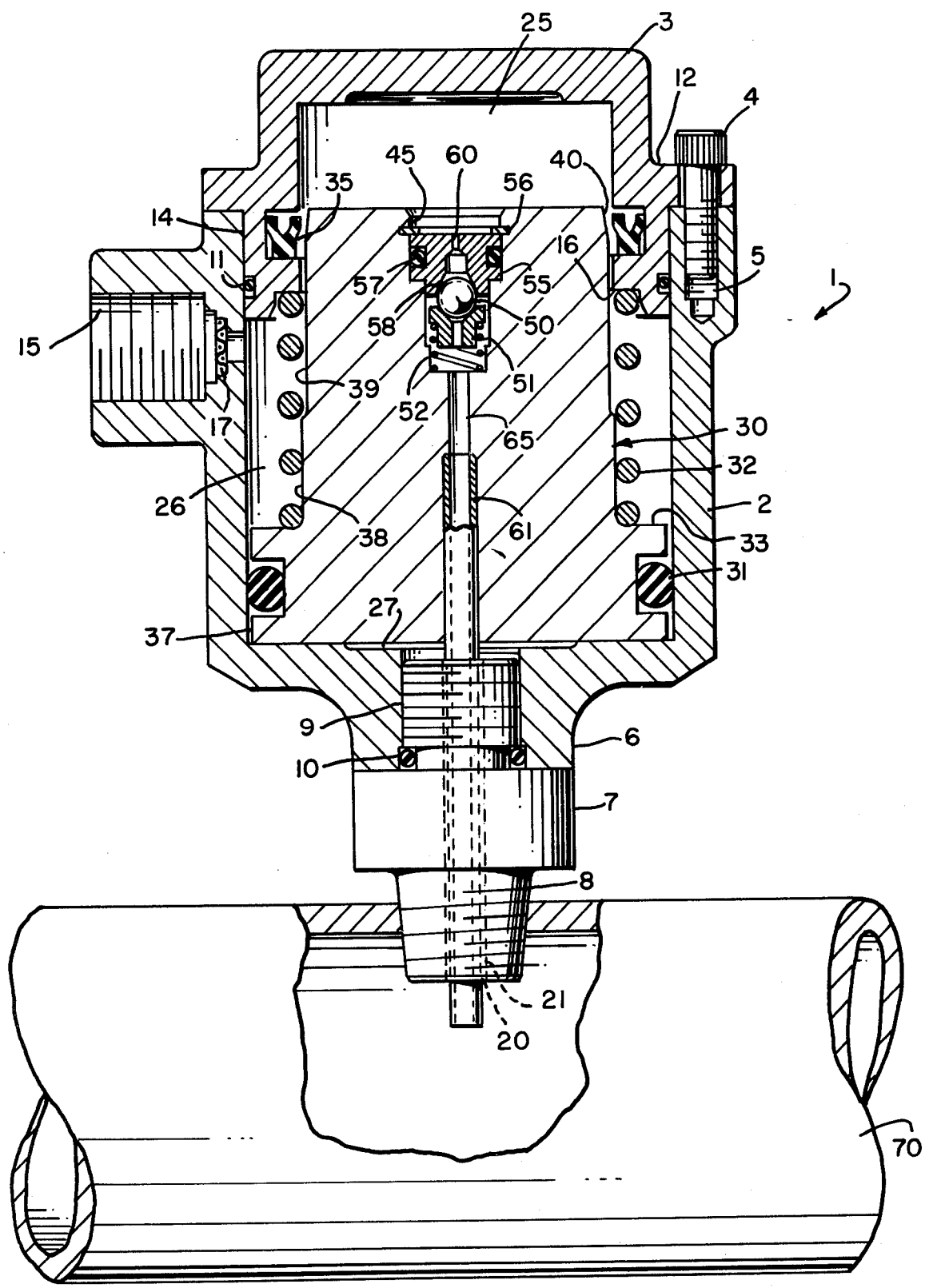

AIR LINE LUBRICATOR

BACKGROUND OF THE INVENTION

Air line lubricators for air motors are generally categorized as continuous or one shot lubricators. Continuous lubricators, as the name implies, continuously supply a small amount of lubricating oil to the air line regardless of demand. These lubricators are generally satisfactory where the demand for air is relatively constant and the using devices are relatively similar. These lubricators often restrict the air flow.

The one shot lubricator was developed to accomodate sporadic or heavy intermittent demands and, as the name implies, generally inject a particular quantity of lubricating oil into the air line once the air line is pressurized. These devices are commonly of the in-line type with small or limited reservoir capacity which poorly distribute the oil during a continuous run.

SUMMARY OF THE INVENTION

The object of the present invention is to provide a compact air motor lubricator which may be attached directly to an air line and operate with a remote oil supply reservoir of sufficient capacity to avoid the necessity of constant or daily refilling.

A further object of the invention is to provide an air motor lubricator which is inexpensive and reliable in operation. A further object is to provide an air motor lubricator which is self priming, load responsive, and injects the lubricating oil directly into the air stream for a prolonged period.

Yet a further object is to provide an air motor lubricator which has only one check valve and one moving piston. It is also an object of this invention to provide an air motor lubricator which utilizes a unique U-seal in combination with a bevelled piston to accomplish unidirectional oil flow and recharging.

These and other objects are obtained in an air line lubricator comprising a hollow body having two different cross sectioned areas, a stepped sealed piston movable in the body to form three variable chambers therein in conjunction with the body, the first variable chamber towards one end of said body having the greater cross section being in communication with the air line, the second of the variable chambers intermediate the first chamber and the third chamber formed by the smaller cross section of the piston in the greater cross section of the body toward its other end and the smaller cross section of said piston, the third chamber being in communication with a lubricant supply, a directional seal coacting with the smaller cross section of the body and the smaller cross section of the piston to allow lubricant to pass from the second chamber to the third chamber when the piston moves toward the one end, a bore in said piston therethrough from the one end of the piston to the other end of the piston communicating between the first and the third chambers, a check valve in the bore to permit lubricant flow only from the third chamber to the first when the piston moves towards the other end of the body, and a metering means in the bore to control the rate of lubricant flow.

BRIEF DESCRIPTION OF THE DRAWINGS

FIG. 1 shows a partial cross section view in elevation of the air line lubricator according to the present invention.

DESCRIPTION OF THE PREFERRED EMBODIMENT

A lubricator, as shown in FIG. 1 and generally designated by reference numeral 1, is comprised of a cup-like cylindrical body 2 to which is attached an inverted cup-like end cap 3 by means of conventional cap screws 4 or the like. The cap screws 4 are shown inserted in screw bores 5 of the cup body 2. The cap 3 has a horizontal flange 12 through which the cap screws 4 are inserted. The cap screws 4 are conveniently located around the circumference of the horizontal flange 12.

A vertical flange 14 extends into the interior of the cup body 2 and is provided with a cap seal o-ring 11 to form a seal chamber within the cup body 2 and end cap 3. Disposed within the cavity is a stepped piston 30 having its major diameter 37 in proximate contact with the cup body 2. The piston 30 is capable of axial displacement (vertical, as shown in FIG. 1). An o-ring seal 31 in a groove in the major diameter 37 effects a positive seal.

The piston 30 has an intermediate diameter 38 which permits formation of an oil preload chamber or intermediate chamber 26. The piston 30 also has a minor diameter 39 which cooperates with the interior diameter of the cap 3 to form an oil pressurizing or pumping chamber 25. As can be seen in FIG. 1, the minor diameter 39 of the piston 30 is of sufficient length to communicate with the intermediate chamber 26. The minor diameter may in fact be carried all the way to land 33 without materially effecting operation apart from spring stabilization.

A spring 32 biases the piston 30 downward as shown in FIG. 1 and is disposed between the land 33 formed by the major diameter 37 and the intermediate diameter 38 and a land 16 formed on vertical flange 14. Land 16 also serves to position a U-shaped check seal 35, the function of which will be later described.

The cup body 2 is provided with a threaded oil supply connection 15. A pipe or hose leading to a reservoir of sufficient capacity would be connected to the oil supply connection in operation and is not shown. Oil from the reservoir would enter intermediate chamber 26 through oil inlet 17 during normal operation. Oil entering intermediate chamber 26 may pass land 16 and pass check seal 35 with the position of the piston shown in FIG. 1. Clearance between the check seal 35 and the piston 30 is provided by a bevel 40 at the top of the piston.

Shown inserted in the top of piston 30 in a stepped counter bore 45 is an orifice plate 55 which is retained in the stepped counter bore 45 by means of a snap ring 56 and is sealed against peripheral flow by means of orifice o-ring seal 57. The orifice plate 55 is provided with a metering orifice 60 which controls the flow rate of lubricant.

A ball check 50 cooperates with a seat 58 in the orifice plate 55 to permit lubricant flow only in the vertically downward direction as shown in FIG. 1. A ball check guide 51 and ball check spring 52 are shown disposed in the stepped counter bore 45 to urge the ball check 50 towards the seat 58.

A discharge bore 65 extends from the stepped counter bore 45 through piston 30. A discharge tube 61 which is inserted in discharge bore 65 further extends the discharge bore through the bottom of the cup body 2 and neck 6 and into the interior of an air line 70.

In the preferred embodiment, the lubricator 1 is shown connected to the air line 70 by means of a male connecting coupling 7 having a pipe thread 8 on one end connected to the air pipe and a straight thread 9 on its other end connected to the cup body 2 at the neck 6. Leakage past thread 9 and the neck 6 of the cup body 2 is prevented by o-ring seal 10 in a conventional manner. The male connecting coupling 7 is provided with a bore 21 which communicates between the interior of the air line 70 and air pressure chamber 27 formed between the piston 30 and the bottom of the cup body 2.

Discharge tube 61 passes through the center of bore 21 with sufficient diameteral clearance to form a concentric air flow path 20. Through this path, air pressure in air line 70 is communicated to air pressure chamber 27. The discharge tube extends into the air line beyond the air line wall. This permits deposit of oil directly into the air stream without the surface effect of the air line wall. In addition, since the discharge tube moves with the piston it is less likely to become clogged or form a blockage in the air line.

In operation, lubricating oil enters intermediate chamber 26 from the reservoir through oil inlet 17. Air flows through concentric path 20 to pressurize air chamber 27 thereby causing piston 30 to be displaced vertically upwards as shown in FIG. 1. Once the piston 30 has moved sufficiently to permit the bevel 40 to pass U-shaped seal 35, it should be obvious to one skilled in the art that chamber 25 will become pressurized and its oil contents forced through orifice 60, past check valve 50, through discharge bore 65 and the interior of discharge tube 61 into the air line 70.

In a typical air motor starter application, the orifice might be sized to provide forty seconds worth of oil discharge. The size of the orifice controls the discharge timing in cooperation with the air pressure in the air line.

Once air pressure is removed from the air line, the return spring 32 will force the piston 30 downward creating a partial vacuum in oil compression chamber 25. Due to the unique U-shaped construction of check seal 35, oil may bypass the check seal in a controlled manner to fill the vacuum created in oil compression chamber 25. In effect, check seal 35 acts as a check valve and seal to provide a positive pumping action for the lubricating oil. It should be understood that although the check seal has been described as a U it may be V, Y, or chevron shaped or any other directional seal configuration allowing preferred one way flow. This makes the device according to the present invention self priming without the need for a separate check valve and associated porting.

The resulting device, as can be appreciated by one skilled in the art, is extremely simple, reliable, and readily adapatable by means of changing the size of orifice 60 to accomodate a wide range of oil flow and time demands.

Although we have described our invention in terms of a preferred embodiment, numerous modifications are possible and will occur to one skilled in the art. We therefore do not wish to be limited in the scope of our invention except as claimed.

We claim:

1. An air line lubricator comprising:
   a hollow body having two different cross sectioned areas;
   a stepped sealed piston movable in said body to form three variable chambers therein in conjunction with said body;
   a first of said variable chambers towards one end of said body having the greater cross section being in communication with the air line;
   a second of said variable chambers intermediate said first chamber and the third chamber formed by the smaller cross section of said piston in said greater cross section of said body;
   said third chamber being formed between the smaller cross section of said body toward its other end and said smaller cross section of said piston, said third chamber being in communication with a lubricant supply;
   a directional seal coacting with said smaller cross section of said body and said smaller cross section of said piston to allow lubricant to pass from said second chamber to said third chamber when said piston moves toward said one end;
   a bore in said piston therethrough from said one end of said piston to the other end of the piston communicating between said first and said third chambers;
   a check valve in said bore to permit lubricant flow only from said third chamber to said first when said piston moves towards said other end of said body; and
   a metering means in said bore to control the rate of lubricant flow.

2. An air line lubricator according to claim 1 wherein said check valve is a spring loaded ball check in said bore.

3. An air line lubricator according to claim 1 wherein said one end is provided with a connection to an air line, said connection having a passageway connecting said air line to said first chamber.

4. An air line lubricator according to claim 1 wherein said directional seal is a U-shaped seal in cross section with the top of the "U" facing said third chamber.

5. An air line lubricator according to claim 1 wherein air pressure urges said piston towards said other end and a spring urges said piston towards said one end.

6. An air line lubricator according to claim 5 wherein said spring is located in said second chamber.

7. An air line lubricator according to claim 1 wherein said metering means is an orifice in said bore.

8. An air line lubricator according to claim 7 wherein a dispensing tube is connected to said piston extending said bore to said air line for discharging lubricant thereto and forming an annular passageway for communicating air line pressure to said first chamber.

9. An air line lubricator according to claim 8 wherein said dispensing tube extends beyond the connection of the lubricator to the air line to discharge lubricant directly into the air stream beyond the wall of the air line.

* * * * *